Figure 1:
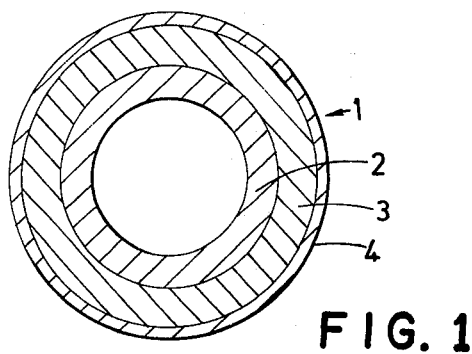

United States Patent [19]

Smith

[11] 3,934,889

[45] Jan. 27, 1976

[54] FIRE SEAL

[75] Inventor: Stanley Smith, Wotton-under-Edge, England

[73] Assignee: Rolls-Royce (1971) Limited, London, England

[22] Filed: Sept. 11, 1974

[21] Appl. No.: 504,918

[30] Foreign Application Priority Data

Sept. 22, 1973 United Kingdom............... 44560/73

[52] U.S. Cl. ................... 277/226; 277/34; 277/229
[51] Int. Cl.² ........................................... F16J 15/00
[58] Field of Search ........ 277/34, 227, 233, DIG. 6, 277/34.3, 226, 229

[56] References Cited
UNITED STATES PATENTS

| | | | |
|---|---|---|---|
| 2,832,618 | 4/1958 | Knoll et al. ........................... | 277/34 |
| 3,642,291 | 2/1972 | Zeffer et al. .......................... | 277/34 |
| 3,719,366 | 3/1973 | Pippert ................................ | 277/233 |

FOREIGN PATENTS OR APPLICATIONS 502,643  3/1939  United Kingdom................ 277/233

OTHER PUBLICATIONS

"Graphite Cloth," Chemical Engineering, May 4, 1959, p. 70.

Primary Examiner—Samuel B. Rothberg
Attorney, Agent, or Firm—Stevens, Davis, Miller & Mosher

[57] ABSTRACT

A Fire seal is formed in three layers, an elastic inner tube which is inflatable, a resilient fire resistant felt surrounding the tube, and a wear resistant rubber impregnated outer layer.

6 Claims, 2 Drawing Figures

FIRE SEAL

The present invention relates to seals and relates in particular to seals capable of withstanding exposure to fire.

In an aircraft the engine or engines are mounted in nacelles externally of the fuselage or even within the fuselage itself. There is danger in both these types of installation that fuel or oil leaking from parts of the engine can ignite in the hotter regions of the engine and this can spread to the aircraft fuselage. Seals have, therefore, been developed for preventing the spread of fire at the interface between the airframe and the engine.

Such seals have to withstand naked flames for a minimum period laid down by regulations relating to aircraft construction. In addition they have to work in an environment in which they are exposed to high temperature and various aircraft fluids during normal operation, and yet they must remain flexible enough to maintain a seal in spite of relative movements of the engine and airframe, for example, during aircraft manoeuvres.

According to the present invention there is provided a fire seal comprising an elastic inner tube capable of being pressurised by fluid under pressure, a flame resistant resilient intermediate layer surrounding said inner tube, and a wear resistant outer layer surrounding said intermediate layer.

The inner tube may be made from a silicone or fluorocarbon elastomer or even from natural rubber, and may be re-inforced with woven fibres or impregnated for additional strength.

In a preferred form of the seal the inner tube comprises a silicone elastomer reinforced with fibrous material, and is supplied with pressurised air from a convenient source to enable it to be expanded to fill the space between the two members between which a seal is required.

The intermediate layer may be a felt made from carbon, asbestos, quartz, or even a metal, but is preferably a resilient carbon felt flame barrier which may be concentric or asymmetric with the inner tube.

Figure 2:
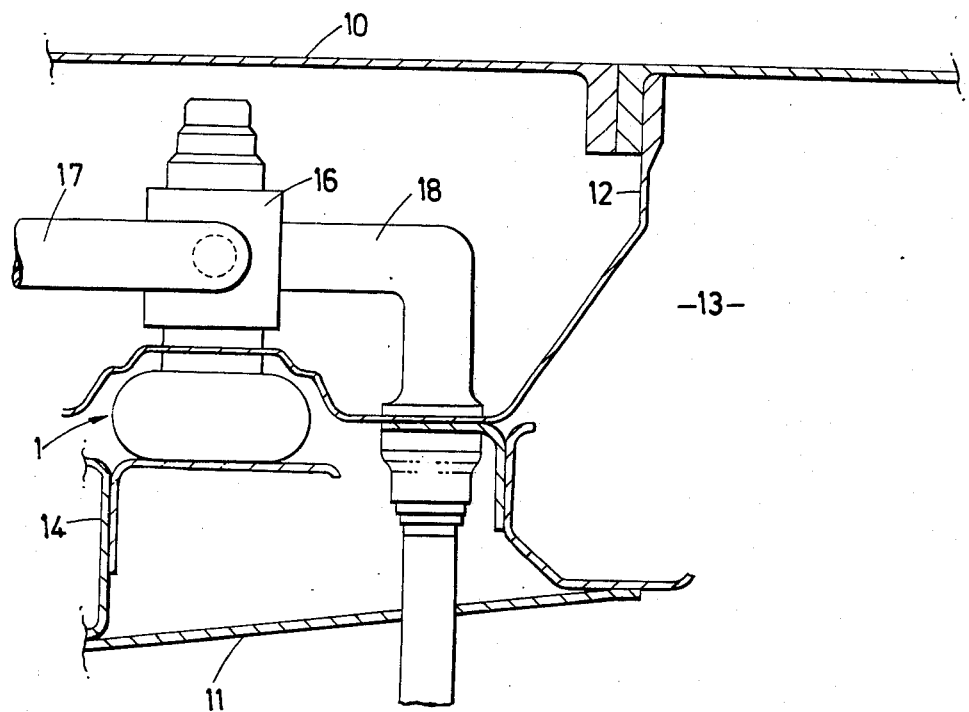

The outer layer is preferably a glass fibre wear resistant sleeve which itself may be impregnated with a rubber material to give good surface sealing. Alternatively carbon fibre may be substituted for the glass fibre. The invention will now be more particularly described with reference to the accompanying drawings in which:

FIG. 1 is a section through a fire resistant seal constructed in accordance with the present invention, and FIG. 2 is a diagrammatic representation of a typical installation of a seal of FIG. 1.

Referring now to the drawings in FIG. 1 there is shown a section through a composite seal 1 illustrating the different layers of material included in the seal.

The innermost layer 2 is a silicone elastomeric inner tube 2 m.m. thick and re-inforced with woven fibres of a material sold under the trade name of REFRASIL by Dunlop Aviation Limited. The tube is pressurised from a convenient source of pressurised air, for example, the compressor of a gas turbine engine, see FIG. 2.

The intermediate layer 3 is a highly heat resistant, resilient felt of carbon or graphite, 3 m.m. thick, and the best materials found during testing were materials sold under the trade names of RVC & RVG by Le Carbone Company.

The outer layer 4 is a 1 m.m. thick layer of a composite material sold under the trade name of VIDA FLEX by the Dunlop Aviation Company and which consists of glass fibre impregnated with an elastomeric fluorocarbon material sold under the trade name VITON. The VIDAFLEX material may be coated with VITON for improved sealing.

A composite seal made from the materials described above was tested in a ring between two plates to simulate bulkhead components, the inner tube was pressurised to 16 p.s.i.g., so that it formed a good seal between the plates. A flame from a gas torch was played on the seal and it was found that the seal had not ruptured after 15 minutes exposed to the flame before the test ended.

Clearly the thickness of the different layers must be determined in each case by the width of the space to be sealed and the resilience needed to take account of any relative movement between the components which the seal contacts to form the seal.

A typical application for such a seal is in an airframe, at the interface between an engine and airframe as shown in FIG. 2.

The engine outer casing is shown at 10 and the airframe at 11. Fireproof bulkheads 12 and 14 extend from the engine casing and the airframe respectively into the space 13 between the engine and the airframe, and the fire seal 1 is positioned to form a seal between the two.

A valve 16 is provided through which the seal can be inflated and deflated. Inflation is effected by means of a compressed air supply from the engine compressor (not shown) via an inlet pipe 17, and an outlet pipe 18 enables the seal to be deflated when the valve is operated.

For such an application the seal has to be sufficiently flexible to take account of the relative movement between the engine and airframe under $g$ loadings during an aircraft manoeuve, as well as differential thermal expansions between engine and airframe, and manufacturing tolerances. The pressurised seal described above and supplied with air from the engine compressor to 16 p.s.i. was found to be sufficiently flexible.

In areas where there is little room the thickness of the carbon felt can be reduced at the areas of contact between the seal and the bulkhead provided the felt thickness is maintained at positions exposed to the flame. This gives an asymmetric arrangement of felt around the inner tube which may have a minimum thickness of 1.5 m.m. Clearly thickness can vary for different applications and where the time period of flame resistance required is smaller, the thickness of the felt may be reduced.

Similarly, where variations in gap width across which the seal is formed are small or do not occur it may not be necessary to inflate the inner tube. In these circumstances reliance is placed on the natural resilience of the seal.

Various alternative materials may be used which fall within the broad specifications quoted above.

For example, the elastic inner tube may be made from silicone or fluorocarbon elastomers of even natural rubber.

The flame resistant, resilient intermediate layer may be formed from a felt of materials other than carbon for example asbestos, quartz or even a metal, provided a natural resilience is preserved.

The wear resistant outer layer may be formed using carbon fibres or may comprise a rubber impregnated with wear resistant particles.

In order to manufacture the composite seal the intermediate felt layer is wrapped around the rubber inner tube and the two layers are held together and are pushed into a sleeve of the outer covering material.

We claim:

1. A fire seal comprising an elastic inner tube capable of being pressurised by fluid under pressure, a resilient intermediate layer of fire-resistant carbon felt surrounding said inner tube, and a wear resistant outer layer surrounding said intermediate layer.

2. A fire seal according to claim 1 and wherein the inner tube comprises a silicone elastomer re-inforced with fibrous material.

3. A fire seal according to claim 1 and wherein the outer layer comprises a glass fibre wear resistant sleeve impregnated with a rubber material.

4. A fire seal according to claim 1 and wherein the outer layer comprises a glass fibre wear resistant sleeve coated with a rubber material.

5. A fire seal comprising an inner tube of a silicone elastomer material re-inforced with fibrous material and which is capable of being pressurised by fluid under pressure, the inner-tube being surrounded by an intermediate layer of a resilient fire-resistant carbon felt, the intermediate layer in turn being surrounded by a wear resistant sleeve of a glass fibre material impregnated with rubber.

6. A fire seal comprising an inner tube of a silicone elastomer material and which is capable of being pressurized by fluid under pressure, the inner tube being surrounded by an intermediate layer of a resilient fire resistant carbon felt, the intermediate layer in turn being surrounded by a wear resistant sleeve of a reinforced rubber material.

* * * * *